United States Patent
Jones et al.

(10) Patent No.: US 11,769,511 B2
(45) Date of Patent: *Sep. 26, 2023

(54) SYSTEMS AND METHODS FOR POWER-EFFICIENT KEYWORD DETECTION

(71) Applicant: Sonos, Inc., Santa Barbara, CA (US)

(72) Inventors: Aaron Jones, San Diego, CA (US); Saeed Bagheri Sereshki, Goleta, CA (US); Daniele Giacobello, Los Angeles, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,176

(22) Filed: Nov. 30, 2022

(65) Prior Publication Data

US 2023/0186923 A1 Jun. 15, 2023

Related U.S. Application Data

(63) Continuation of application No. 17/248,427, filed on Jan. 25, 2021, now Pat. No. 11,551,700.

(51) Int. Cl.
*G10L 17/22* (2013.01)
*G10L 15/02* (2006.01)
*G10L 15/05* (2013.01)
*G10L 15/22* (2006.01)
*G10L 17/02* (2013.01)

(52) U.S. Cl.
CPC ............ *G10L 17/22* (2013.01); *G10L 15/02* (2013.01); *G10L 15/05* (2013.01); *G10L 15/22* (2013.01); *G10L 17/02* (2013.01); *G10L 2015/223* (2013.01)

(58) Field of Classification Search
CPC ......... G10L 17/22; G10L 17/02; G10L 15/02; G10L 15/05; G10L 15/22; G10L 2015/223
USPC ........................................................ 704/246
See application file for complete search history.

(56) References Cited

U.S. PATENT DOCUMENTS

| | | | | |
|---|---|---|---|---|
| 10,586,540 B1* | 3/2020 | Smith | ............... | G06F 3/165 |
| 11,138,969 B2* | 10/2021 | D'Amato | ............... | G06F 3/167 |
| 11,138,975 B2* | 10/2021 | D'Amato | ............ | G10L 15/1822 |
| 11,189,286 B2* | 11/2021 | Schillmoeller | .......... | G10L 17/22 |
| 11,200,894 B2* | 12/2021 | Smith | ............... | G06F 3/167 |
| 11,200,900 B2* | 12/2021 | Smith | ............... | G10L 15/22 |
| 11,308,958 B2* | 4/2022 | Smith | ............... | G06F 3/165 |
| 11,308,962 B2* | 4/2022 | Smith | ............... | G06F 3/167 |
| 11,315,556 B2* | 4/2022 | Smith | ............... | G10L 15/22 |

(Continued)

*Primary Examiner* — Susan I McFadden
(74) *Attorney, Agent, or Firm* — Fortem IP LLP; Matt Lincicum

(57) ABSTRACT

Systems and methods for audio processing include capturing first sound data via at least one microphone of a network microphone device (NMD) and determining, via a voice activity detection process, that the first sound data does not include voice activity. The first sound data is stored in a buffer, and the NMD forgoes spatial processing of the first sound data. The NMD can capture second sound data and determine, via the voice activity process, that the second sound data includes voice activity. The NMD spatially processes the sound data to produce filtered sound data. The NMD detects a wake word based on data in the buffer. After detecting the wake word, the NMD may determine an action to be performed based on the data in the buffer.

20 Claims, 9 Drawing Sheets

(56) References Cited

U.S. PATENT DOCUMENTS

| | | | | |
|---|---|---|---|---|
| 11,361,756 B2* | 6/2022 | Smith | ............ | G10L 15/22 |
| 11,432,030 B2* | 8/2022 | Smith | ............ | H04N 21/43615 |
| 11,445,301 B2* | 9/2022 | Park | ............ | H04R 5/04 |
| 11,482,224 B2* | 10/2022 | Smith | ............ | G10L 15/22 |
| 11,501,773 B2* | 11/2022 | Smith | ............ | G10L 15/08 |
| 11,538,460 B2* | 12/2022 | Tolomei | ............ | G10L 15/22 |
| 11,540,047 B2* | 12/2022 | Soto | ............ | H04R 3/005 |
| 11,551,700 B2* | 1/2023 | Jones | ............ | G10L 17/02 |

* cited by examiner

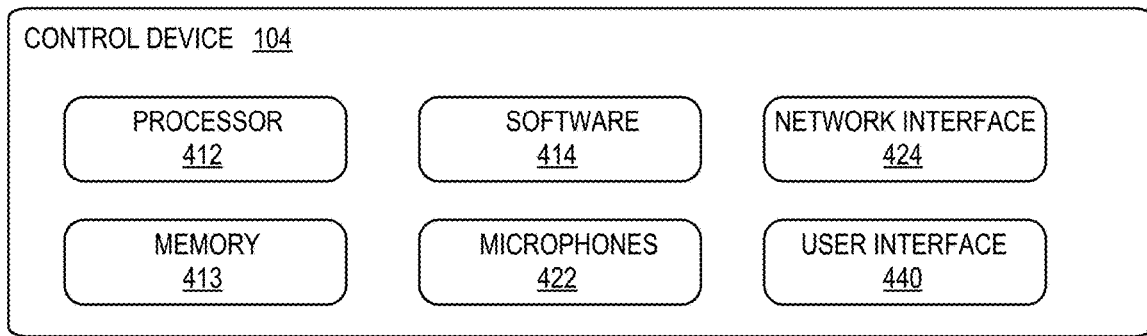
Figure 4A
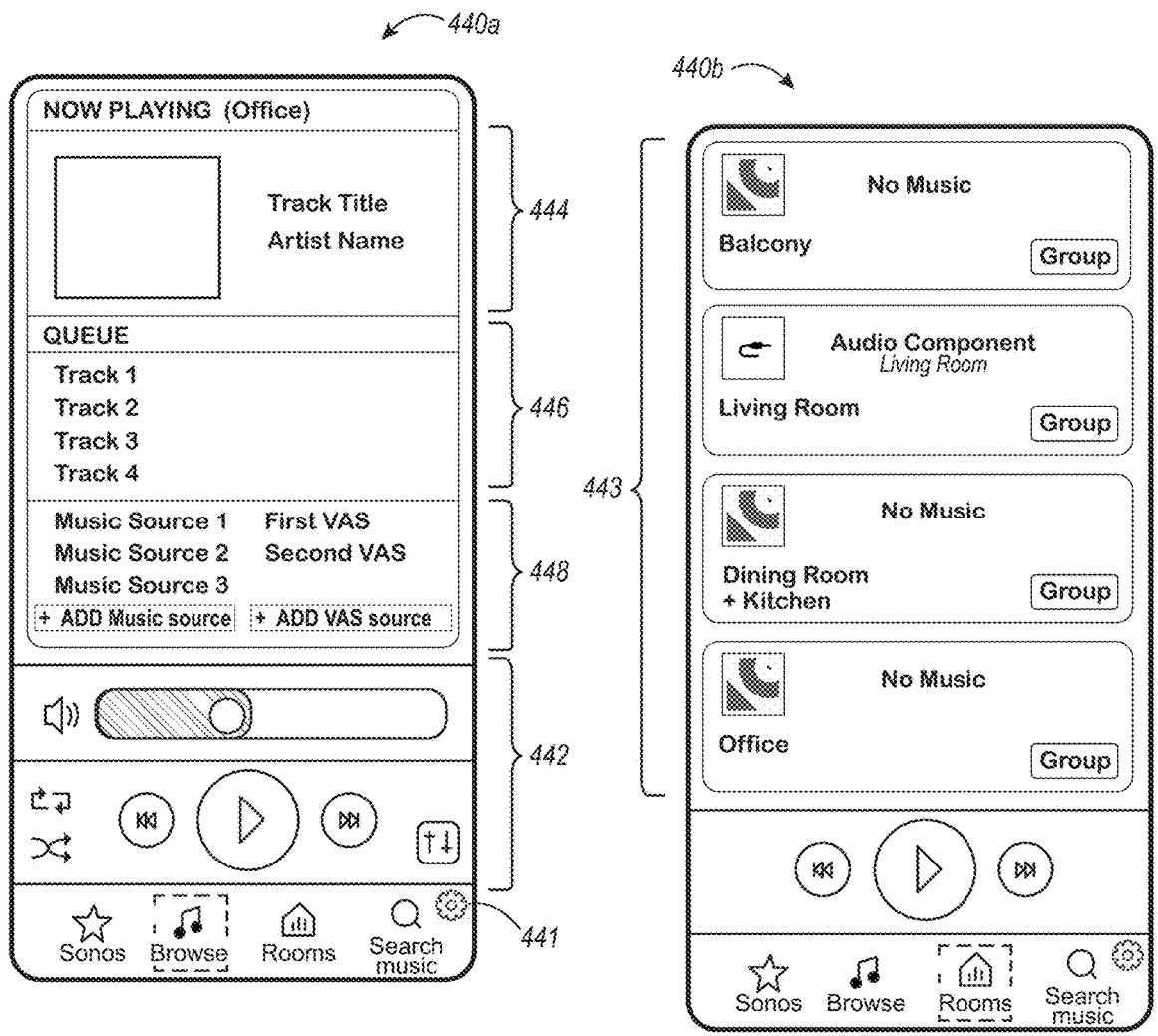
Figure 4B
Figure 4C

SYSTEMS AND METHODS FOR POWER-EFFICIENT KEYWORD DETECTION

CROSS-REFERENCE TO RELATED APPLICATION

This application is a continuation of U.S. patent application Ser. No. 17/248,427, filed Jan. 25, 2021, which is incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 4A is a functional block diagram of an example controller device in accordance with aspects of the disclosure;

FIGS. 4B and 4C are controller interfaces in accordance with aspects of the disclosure;

Figure 1A:
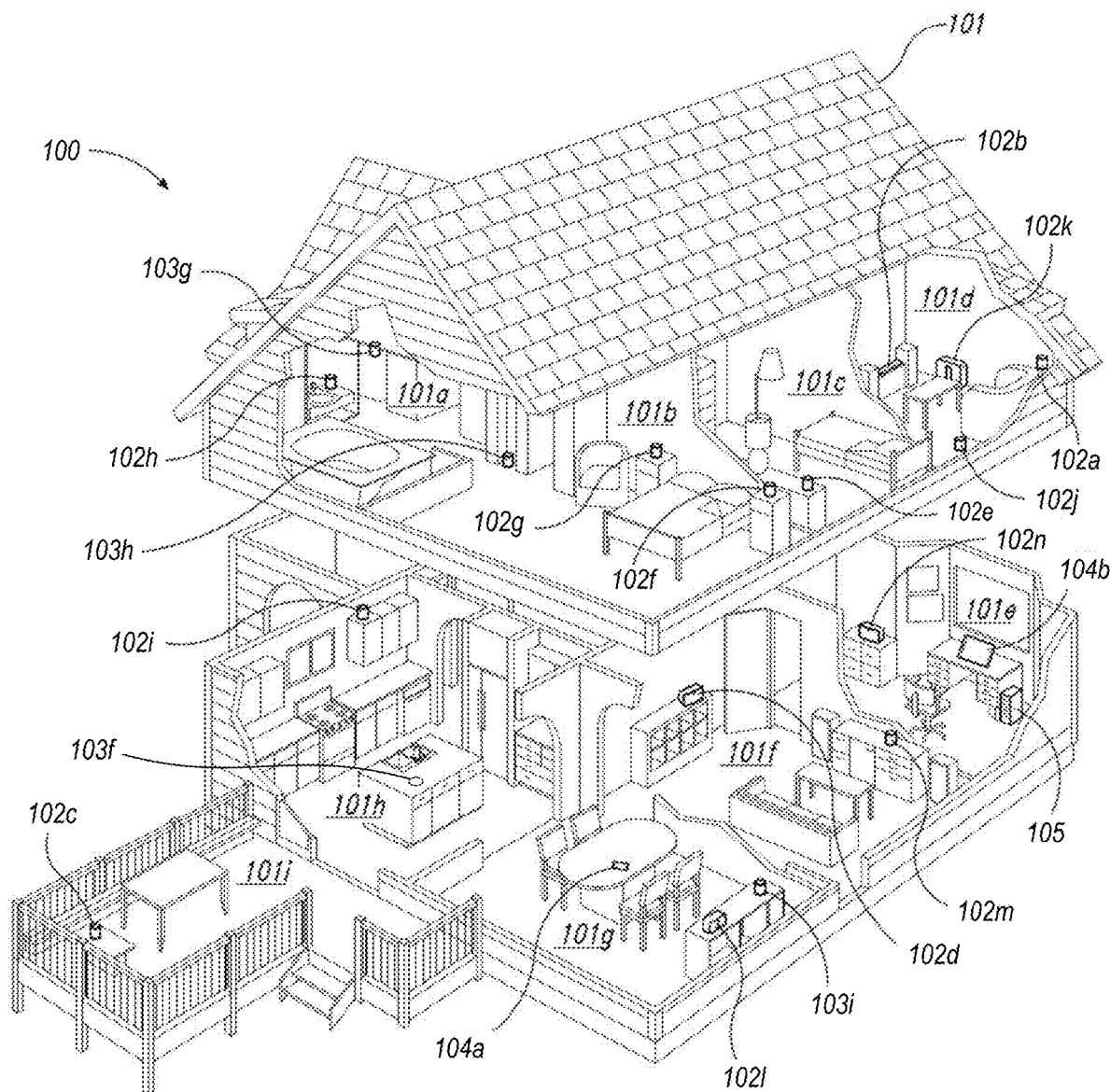
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate voice-assistant service (VAS) for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In some cases, multiple voice services are configured for the NMD, or a system of NMDs (e.g., a media playback system of playback devices). One or more services can be configured during a set-up procedure, and additional voice services can be configured for the system later on. As such, the NMD acts as an interface with multiple voice services, perhaps alleviating a need to have an NMD from each of the voice services to interact with the respective voice services.

Yet further, the NMD can operate in concert with service-specific NMDs present in a household to process a given voice command.

Where two or more voice services are configured for the NMD, a particular voice service can be invoked by utterance of a wake word corresponding to the particular voice service. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular voice service (e.g., "Hey, Sonos" where the NMD is a SONOS playback device). Given such a wake word, the NMD can identify a particular voice service to process the request. For instance, if the voice input following the wake word is related to a particular type of command (e.g., music playback), then the voice input is sent to a particular voice service associated with that type of command (e.g. a streaming music service having voice command capabilities).

Keyword spotting can be computationally demanding and power intensive, as it involves continuously processing sound data to detect whether the sound data includes one or more keywords. In particular, voice processing operations such as spatial filtering, noise cancellation, and wake-word detection can increase computational load, resulting in increased average CPU clock rate and accompanying power consumption. Increased power demands may require larger batteries in the case of portable devices, and/or may require tradeoffs among other components such as audio amplifiers, wireless transceivers, or other electronic components that also consume power. Accordingly, there remains a need to reduce the computational demands and power consumption associated with detecting keywords in voice input provided by a user.

One way to address these issues is to place at least some voice processing components of an NMD into a low-power, standby, or disabled stage for certain periods of time. However, from a user-experience perspective, it is desirable to maintain the NMD in a state that can receive voice input from a user at any time, without requiring separate intervention by the user (e.g., pressing a button or adjusting a setting on the NMD). Embodiments of the present technology solve this and other problems by providing a multi-stage NMD that can monitor sound data for voice activity while in a low-power stage and only activate downstream voice processing components once voice activity has been detected. Another potential future benefit may be helping to meet energy efficiency regulations which may be imposed on consumer electronic products, for example, if official limitations are enacted for power consumption in the idle state when the playback device is not active.

In some examples, the NMD can default to a low-power or standby stage. While in this low-power stage, the NMD captures sound data using one or more microphones and analyzes the captured sound data to detect voice activity. If no voice activity is detected, the NMD can maintain the low-power stage and continue to monitor detected sounds for voice activity. In various embodiments, the NMD can use any suitable technique for detecting voice activity in the sound data. In particular, any suitable algorithm or combination of algorithms for determining a speech presence probability may be used. For example, certain acoustic features can be extracted from the sound data, such as energy-based features (e.g., signal-to-noise ratio), periodicity (e.g., speech signals tend to be more periodic than background noises), speech signal dynamics (e.g., analyzing the variance of power envelopes), or others. One or more such acoustic features can then be analyzed using statistical models or other discriminators to detect voice activity in the sound data. Example classifiers include Gaussian mixture models, Laplacian models, or other classifiers that discriminate between voice and non-voice sound data. Various other approaches to identifying speech in captured sound data may be used.

Once voice activity is detected in the sound data, the NMD can transition to a second, high-power or fully operational stage. In this second stage, the NMD can further process the captured sound data utilizing downstream components that were previously in a disabled or standby stage or otherwise consuming less power. This further processing can include the activation and operation of relatively power-demanding components to perform additional tasks, such as spatial filtering, acoustic echo cancellation, wake-word detection, and data transmission over a network interface (e.g., streaming captured sound data to a remote VAS for processing). After voice activity is no longer detected, after a VAS interaction is determined to be concluded, and/or after a predetermined period of time has elapsed, the NMD can revert to the first, low-power or standby stage. As such, by limiting the operation of certain power-intensive components of the NMD to those instances in which voice activity is detected, overall power consumption can be reduced without deleteriously impacting the user experience.

As an example, in some embodiments an NMD detects sound via at least one of its microphones. The NMD can determine, via a voice activity detection process, whether the detected sound includes voice activity. When no voice activity is detected in the sound data, the NMD can operate in a first stage, in which the NMD forgoes spatial processing (and optionally other processing steps) of the sound data, resulting in unfiltered sound data. Once voice activity is detected in the detected sound, the NMD can transition to a second stage that is more power-intensive than the first stage. While in the second stage, the NMD can spatially process (e.g., using a multi-channel Wiener filter or other suitable spatial processing technique) at least the second portion of the captured sound data, thereby producing filtered sound data. The NMD may then detect, via a wake-word engine, a wake word in the sound data. In some examples, the wake word can be detected based on both the unfiltered sound data and the filtered sound data. After detecting the wake word, the NMD may then determine an action to be performed based on the sound data (e.g., pause audio playback, transmit data to a remote VAS, etc.). After voice activity is no longer detected, after a VAS interaction is determined to be concluded, and/or after a period of time has elapsed, the NMD may revert from the second stage to the first stage, thereby reducing power consumption.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
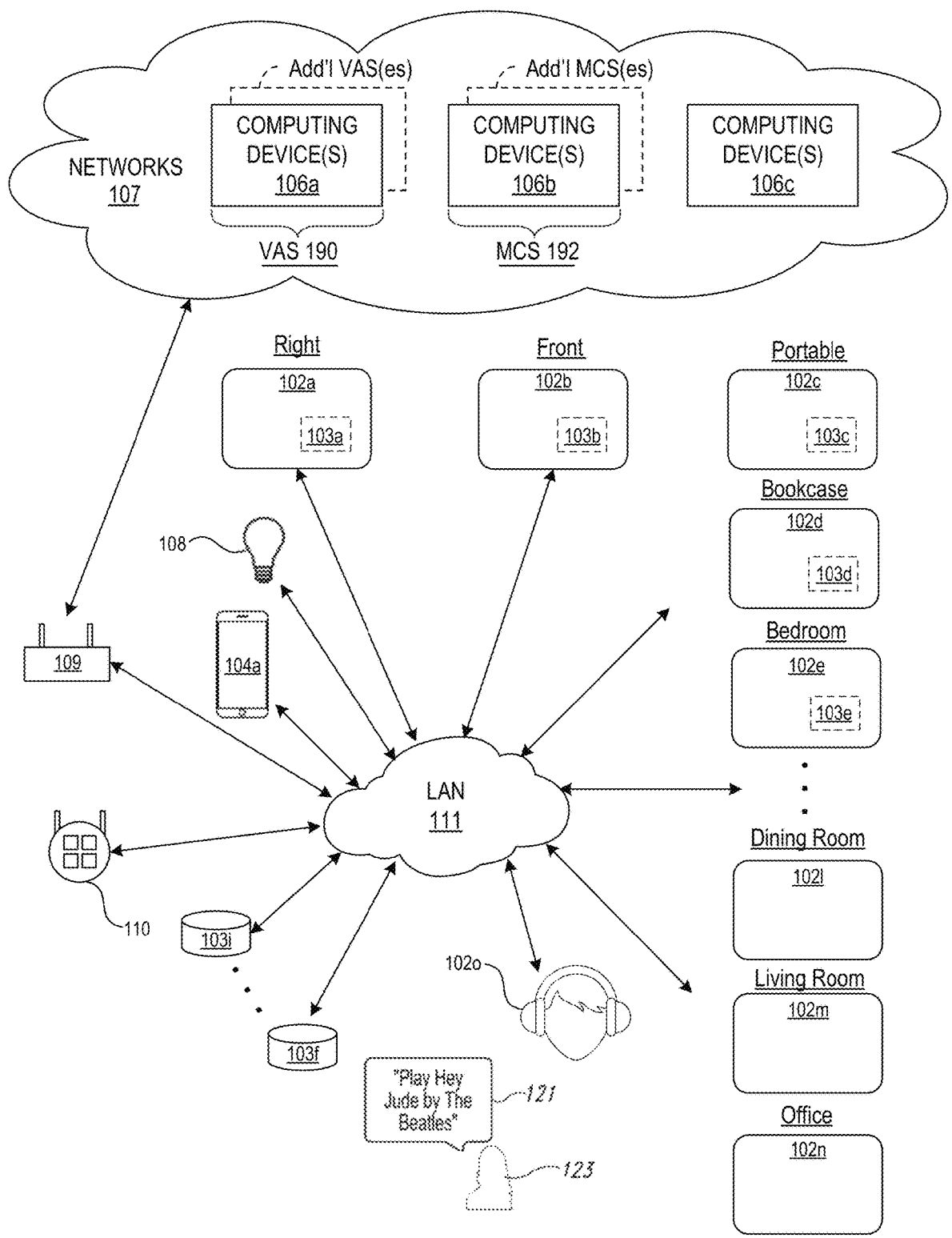
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented.

Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a-d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
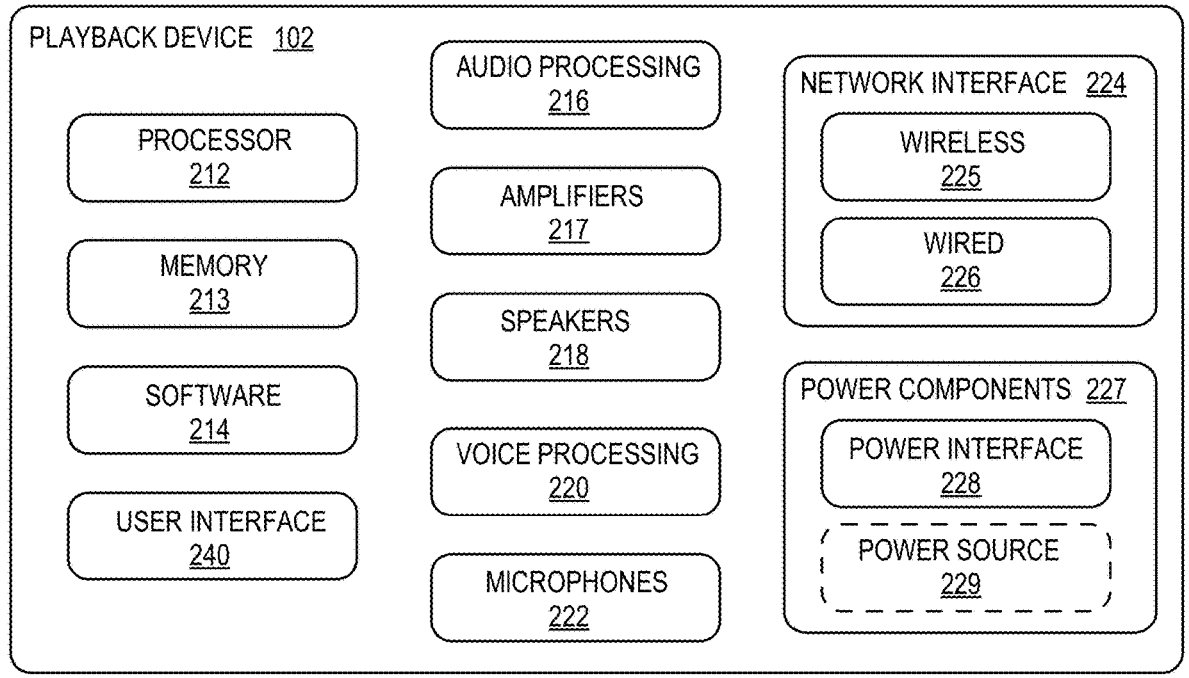
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
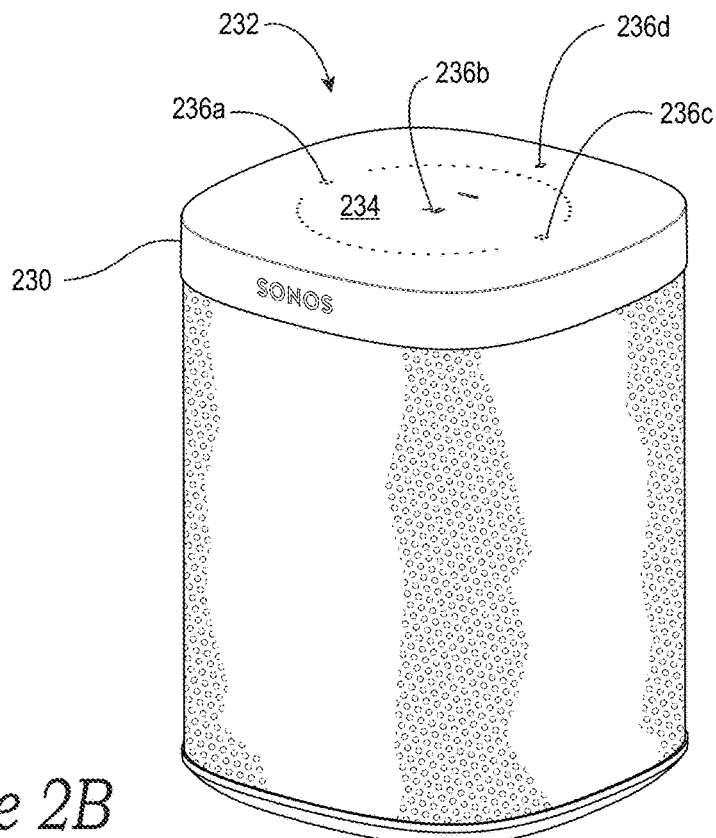
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
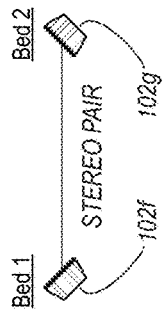
FIGS. 3A-3E are diagrams showing example playback device configurations in accordance with aspects of the disclosure.
Figure 3C:
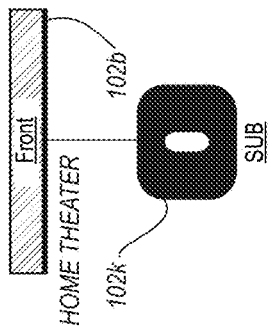
Figure 3D:
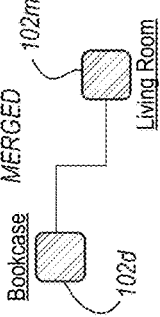
Figure 3E:
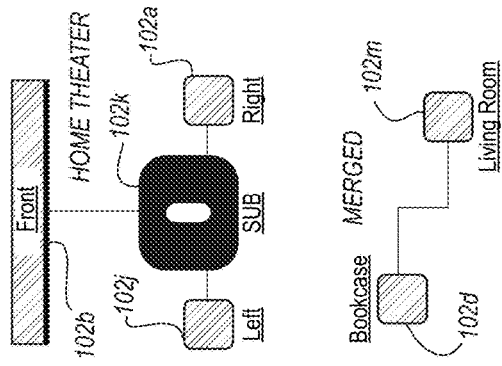
Figure 3A:
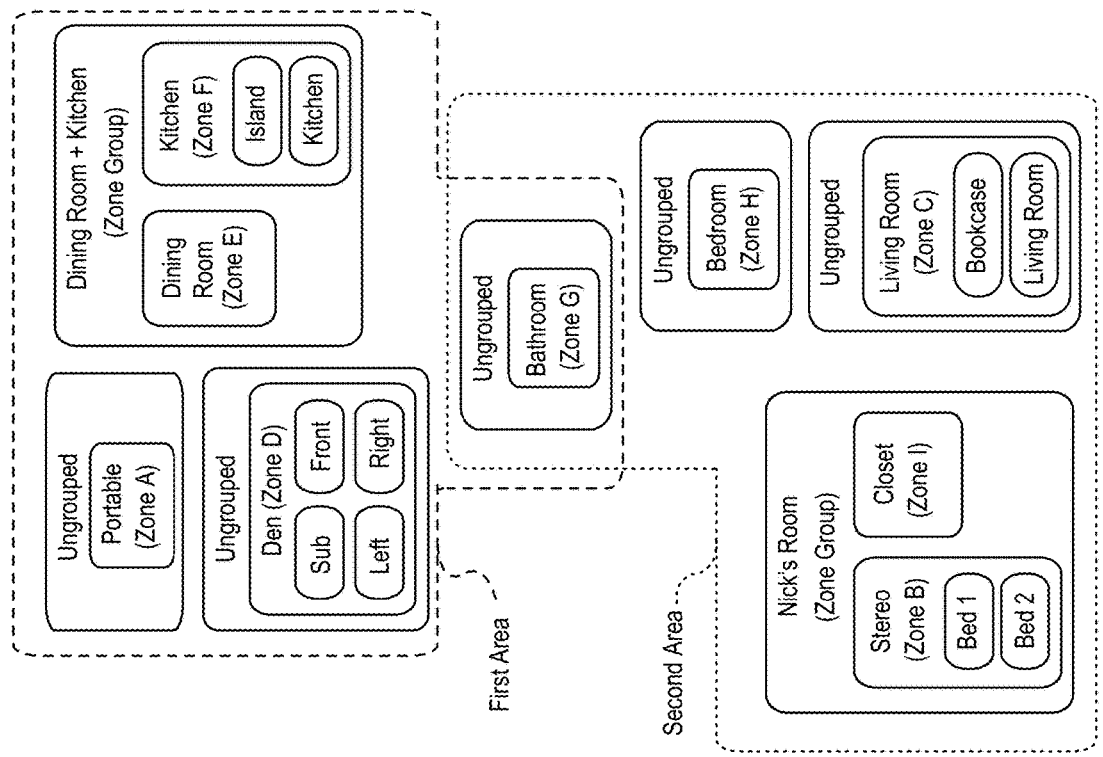

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
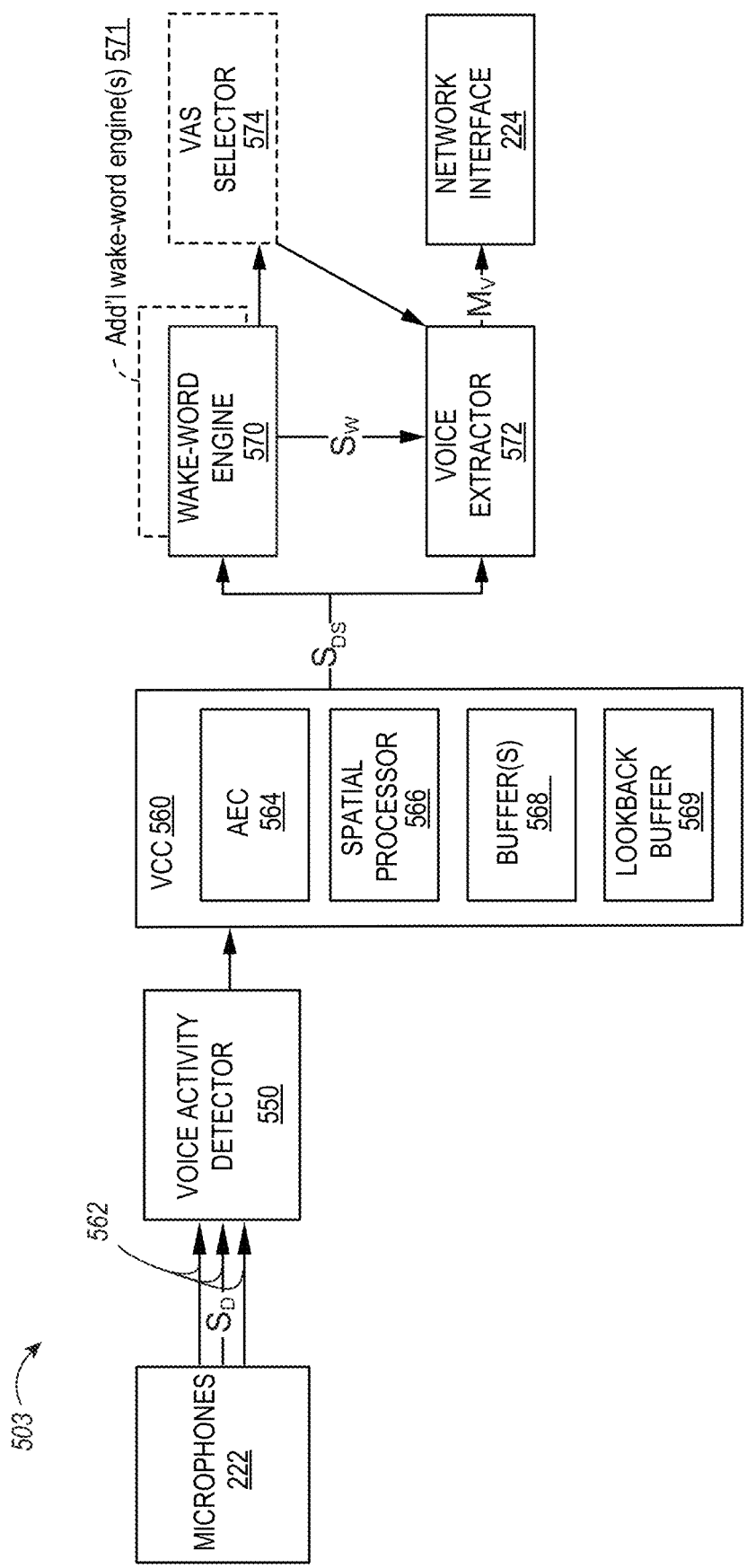
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes a voice activity detector 550, voice capture components ("VCC", or collectively "voice processor 560"), a wake-word engine 570, and at least one voice extractor 572, each of which is operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, $S_D$, from the environment of the NMD 503 to the voice activity detector 550. The detected sound $S_D$ may take the form of one or more analog or digital signals. In example implementations, the detected sound $S_D$ may be composed of a plurality signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

In operation, the voice activity detector 550 can process the detected sound $S_D$ to determine whether speech is present. If voice activity is detected, the detected sound $S_D$ can be passed to the VCC 560 for additional downstream processing. While in some embodiments the detected sound $S_D$ is passed to the VCC 560 without any processing via the voice activity detector 550, in various embodiments the voice activity detector 550 may perform certain processing functions such that the input to the voice activity detector 550 is not identical to the output $S_D$ provided to the VCC 560. For example, the voice activity detector 550 may buffer and/or time-delay the signal, may perform channel selection, or any other suitable pre-processing steps.

If, voice activity is not identified in the detected sound $S_D$ via the voice activity detector 550, then the further processing steps may be forgone. For example, the sound data may not be passed to the VCC 560 and downstream components. Additionally or alternatively, the downstream components can be configured to forgo processing the incoming sound data $S_D$, such as by the use of bypass tags or other techniques. In some examples, the downstream components (e.g., VCC 560, wake-word engine 570, voice extractor 572, network interface 224) can remain in a standby, disabled, or low-power state until voice activity is detected via the voice activity detector 550, at which point some or all of these downstream components can transition to a higher-power or fully operational state. When transitioning from the low-power, standby, or disabled stage to a fully operational stage, any number of components may be turned on, supplied power or additional power, taken out of standby or sleep stage, or otherwise activated in such a way that the enabled component(s) are allowed to draw more power than they could when disabled. With this arrangement, the NMD 503 can assume a relatively low-power stage while monitoring for speech activity via the voice activity detector 550. Unless and until the voice activity detector 550 identifies voice activity, the NMD 503 may remain in the low-power stage. In some embodiments, after transitioning to the higher-power or fully operational stage, the NMD 503 may revert to the low-power or standby stage once voice input is no longer detected via the voice activity detector 550, after a VAS interaction is determined to be concluded, and/or once a given period of time has elapsed.

In various embodiments, the voice activity detector 550 can perform a first algorithm for identifying speech in the sound data $S_D$ detected via the microphone(s) 222. The algorithm can include any suitable algorithm for discriminating between speech and non-speech sound data. In some embodiments, the algorithm can include extracting certain acoustic features from the sound data, such as energy-based features (e.g., signal-to-noise ratio), periodicity (e.g., speech signals tend to be more periodic than background noises), speech signal dynamics (e.g., analyzing the variance of power envelopes), or others. One or more such acoustic features can then be analyzed using statistical models or other discriminators to detect voice activity in the sound data. Example classifiers include Gaussian mixture models, Laplacian models, or other classifiers that discriminate between speech and non-speech sound data. Additional examples include using neural network based approaches. As well as energy, other features including entropy, pitch, or zero-crossing rate can be used as input to the classifier. Many approaches can be implemented directly in the time-domain or alternatively in the frequency-domain by applying a filter bank to the microphone input signals. For example, a short-time Fourier transform (STFT) enables SD and the associated features to be efficiently split into multiple frequency bands each of which can be processed independently. In some embodiments, detecting speech in the sound data via the voice activity detector 550 consumes less power and/or computational resources (e.g., as measured by average CPU clock rate or millions of instructions per second (MIPS) values) than one or more of the downstream processes such as spatial processing, acoustic echo cancellation, wake-word detection, or any other downstream signal processing steps. For example, the amount of energy required to power a processing unit is directly related to the clock rate or MIPS, thus by reducing the average MIPS it is possible to also reduce average power consumption. In some embodiments, the VAD 550 process can run on a Digital Signal Processor (DSP) co-processing unit or Low Power Island (LPI), enabling the main CPU to sleep or transition to a low-power state at times when voice activity is not detected.

As further shown in FIG. 5, the voice processor 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S.

patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 is configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake-word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word engine 570 runs multiple wake word detection algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection algorithm for each supported voice service in parallel. In such embodiments, the network microphone device 103 may include VAS selector components 574 configured to pass voice input to the appropriate voice assistant service. In other embodiments, the VAS selector components 574 may be omitted. In some embodiments, individual NMDs 103 of the MPS 100 may be configured to run different wake word detection algorithms associated with particular VASes. For example, the NMDs of playback devices 102*a* and 102*b* of the Living Room may be associated with AMAZON's ALEXA®, and be configured to run a corresponding wake word detection algorithm (e.g., configured to detect the wake word "Alexa" or other associated wake word), while the NMD of playback device 102*f* in the Kitchen may be associated with GOOGLE's Assistant, and be configured to run a corresponding wake word detection algorithm (e.g., configured to detect the wake word "OK, Google" or other associated wake word).

In some embodiments, a network microphone device may include speech processing components configured to further facilitate voice processing, such as by performing voice recognition trained to recognize a particular user or a particular set of users associated with a household. Voice recognition software may implement voice-processing algorithms that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream voice activity detector 550, AEC 564, and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The voice processor 560 also includes at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 222 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some embodiments, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

Figure 6A:
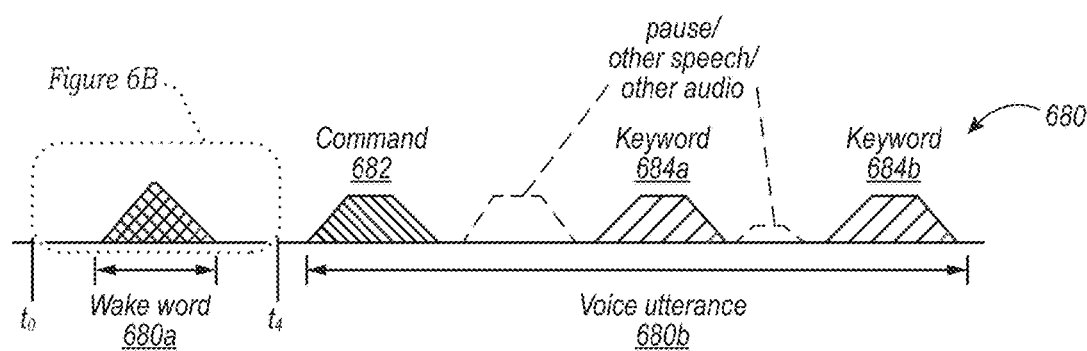
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680a and an utterance portion 680b. The wake-word portion 680a corresponds to detected sound that caused the wake-word event. For instance, the wake-word portion 680a corresponds to detected sound that caused the wake-word engine 570 to provide an indication of a wake-word event to the voice extractor 572. The utterance portion 680b corresponds to detected sound that potentially comprises a user request following the wake-word portion 680a.

Figure 6B:
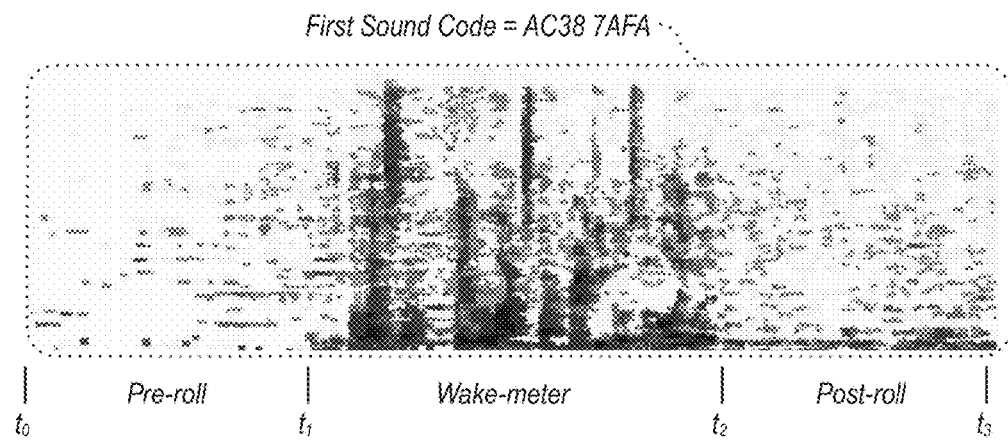
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680a of FIG. 6A. As illustrated, the example first sound specimen comprises sound detected in the playback device 102i's environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680a within the sound-data stream $S_{DS}$ to verify the presence of the wake word. In some instances, the VAS may determine that the wake-word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680a but instead processes only the utterance portion 680b.

In any case, the VAS processes the utterance portion 680b to identify the presence of any words in the detected-sound data and to determine an underlying intent from these words. The words may correspond to a certain command and certain keywords 684 (identified individually in FIG. 6A as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570a, the second wake-word engine 570b, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570a may be configured to identify the wake word "Alexa" and cause the NMD 503 to invoke the AMAZON VAS when "Alexa" is spotted. As another example, the second wake-word engine 570b may be configured to identify the wake word "Ok, Google" and cause the NMD 503 to invoke the GOOGLE VAS when "Ok, Google" is spotted. In single-VAS implementations, the VAS selector 574 may be omitted.

In additional or alternative implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102n, either directly, or indirectly via one or more other devices of the MPS 100, which causes the office device 102n to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Example Multi-Stage NMD Operation for Power Conservation

As shown in FIG. 5, the NMD 503 can include a voice activity detector 550 upstream of the voice capture components 560 (e.g., spatial processor 566), which in turn are upstream of the wake-word engine 570. As noted previously, in operation, the sound data is passed from the microphones 222 to the voice activity detector 550 which can process the sound data $S_D$ to identify the presence of speech therein. In some embodiments, the voice activity detector 550 can utilize an associated buffer storing sufficient frames of sound data $S_D$ to evaluate the sound data for the presence of speech therein. The stored frames can be overwritten on a rolling basis (e.g., using a ring buffer) such the most recent N frames of sound data $S_D$ are stored in the buffer. While the voice activity detector 550 can analyze the sound data $S_D$ on a frame-by-frame basis, it can be useful to store a plurality of frames to compensate for time delay between onset of speech and successful detection of the voice activity. In other words, if the voice activity detector 550 takes 50 ms to detect that the user has started talking, then the signal which gets passed to VCC 560 must be delayed by at least 50 ms so that the first syllables aren't omitted. In practice, performance of noise suppression and wake word detection may both depend on receiving some noise or silence prior to the onset of speech, so the delay may need to be longer (e.g., up to 1 second or more).

In some embodiments, some or all of the downstream components of the NMD 503 can remain in a standby or low-power state unless and until voice activity is detected via the voice activity detector 550. This permits the NMD 503 to continuously monitor the sound data $S_D$ for user input without running the relatively computationally intensive and energy-demanding components that are downstream of the voice activity detector 550. Once the voice activity detector 550 identifies the presence of speech in the sound data $S_D$, some or all of the downstream components can transition to a high-power or fully operational state. This arrangement can take several forms. In some examples, the use of bypass flags or other signal processing techniques can be used such that sound data $S_D$ from the voice activity detector effectively bypasses the downstream components. Additionally or alternatively, the voice activity detector 550 may not pass the sound data $S_D$ along to the downstream components at all unless and until voice activity is detected. In some embodiments, the operation of some or all of the downstream components can be modified while in the low-power state, such that although some processing is performed, it is less energy-demanding and/or computationally intensive than it would be in the presence of voice activity. For example, the acoustic echo cancellation and/or spatial processing steps may continue to operate on the incoming sound data, but may do so in a modified fashion that consumes less power and/or computational resources than they otherwise would.

Figure 7:
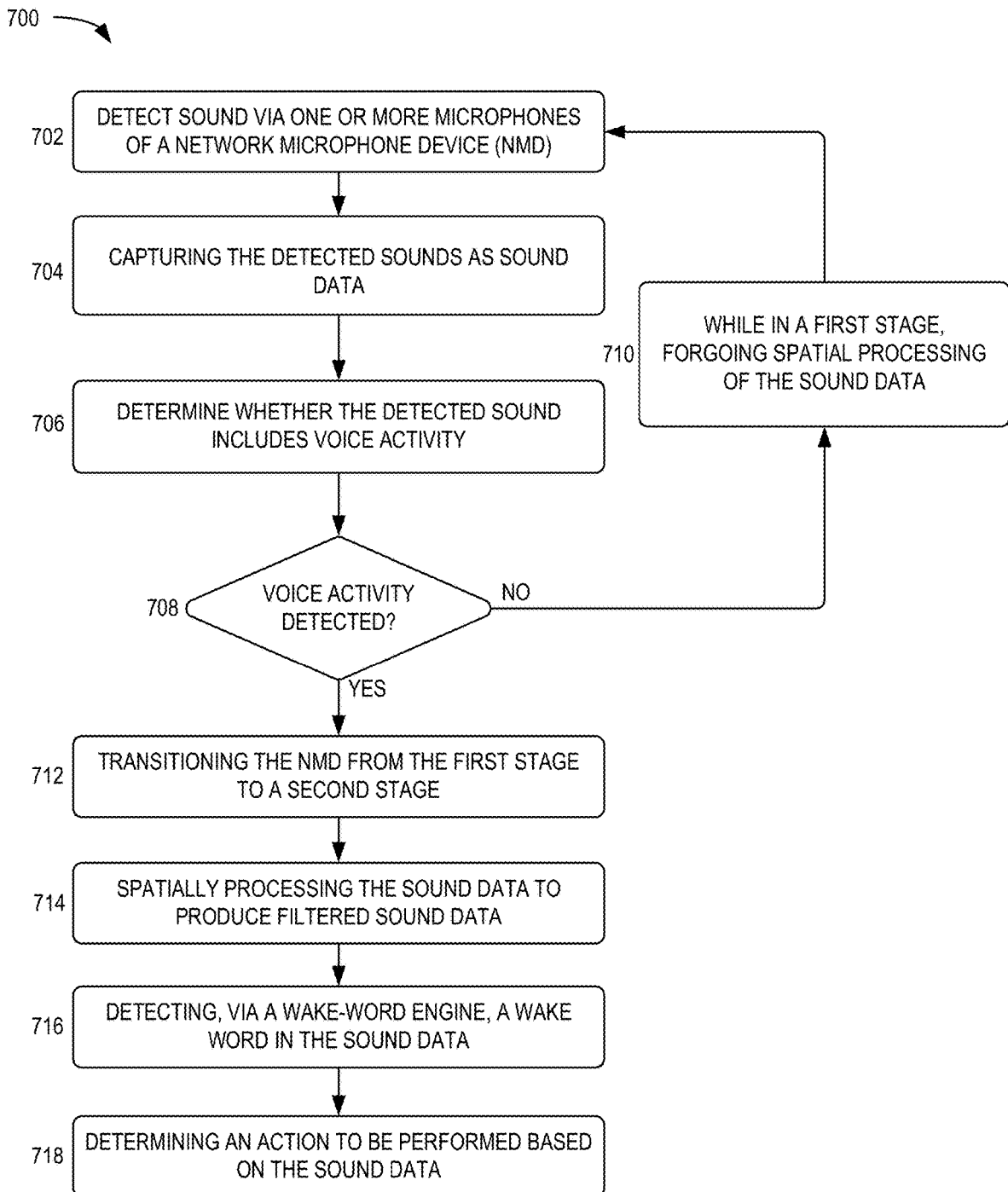
FIG. 7 is a flow chart of an example method for multi-stage voice processing in accordance with aspects of the disclosure.

As discussed above, in some examples, an NMD is configured to monitor and analyze received audio to determine if any voice activity are present in the received audio. FIG. 7 shows an example embodiment of a method 700 for an NMD to determine if any wake words are present in the received audio. The method 700 can be implemented by any of the NMDs disclosed and/or described herein, or any other NMD now known or later developed.

Various embodiments of method 700 include one or more operations, functions, and actions illustrated by blocks 702 through 718. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

The method 700 begins at block 702, which involves the NMD detecting sound via one or more microphones and, in block 704, capturing the detected sound as sound data. The captured sound data includes sound data from an environment of the NMD and, in some embodiments, includes a voice input, such as voice input 680 depicted in FIG. 6A.

At block 706, method 700 involves the NMD determining whether the sound data includes voice activity. As noted previously, The NMD can use any suitable technique for detecting voice activity in the sound data. For example, certain acoustic features can be extracted from the sound data, such as energy-based features (e.g., signal-to-noise ratio), periodicity (e.g., speech signals tend to be more periodic than background noises), speech signal dynamics (e.g., analyzing the variance of power envelopes). One or more such acoustic features can then be analyzed using statistical models or other discriminators to detect voice activity in the sound data.

If, in decision block 708, the sound data does not include voice activity, then the NMD remains in a first low-power stage, as reflected in block 710. While in this first stage, the NMD forgoes spatial processing (and optionally also forgoes additional processing operations) of the sound data, resulting in unfiltered sound data. In some embodiments, this unfiltered sound data can be stored in a buffer and overwritten on a rolling basis. The process then returns to block 702 with continuing detection of additional sound via the one or more microphones.

If, in decision block 708, voice activity is detected, the method 700 continues to block 712, which includes transitioning the NMD from the first stage to a second stage. In some embodiments, the first stage is a low-power or standby stage, and the second stage is a higher-power or fully operational stage, in which some or all components that were in a standby or low-power condition in the first stage are instead in a fully operational stage. As a result, the NMD may consume more power and/or computational resources while in the second stage.

The method 700 continues in block 714 with spatially processing the sound data to produce filtered sound data. This can include, for example using the spatial processor 566 of FIG. 5 to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is may be lower in speech than in most common background noise. In some embodiments, the spatial processor can utilize a multi-channel Wiener filter algorithm or other suitable technique for spatially processing the sound data to produce the filtered sound data.

Because the spatial processor does not initiate processing of sound data until voice activity has been detected in block 706, it can be useful to utilize a spatial processor configuration that does not require significant time for convergence. For example, certain direction of arrival (DOA) tracking techniques may require several seconds of sound data before the spatial processing converges to produce suitable outputs. Accordingly, initiating a DOA tracking spatial processor in response to detection of voice activity via the voice activity detector may result in poor spatial processing of the first frames of sound data. This may hinder the ability of the downstream wake-word engine to detect a wake word and/or may interfere with other downstream processes. Accordingly, it can be beneficial to utilize spatial processing techniques that converge relatively quickly (e.g., within less than about 1 second) upon initiation to produce useful outputs. In some embodiments, a spatial processor utilizing multichannel Wiener filters can satisfy this condition.

In block 716, the method includes detecting, via a wake-word engine, a wake word in the sound data. In some embodiments, this involves the NMD causing the wake-word engine 570 described above in connection with FIG. 5 to utilize a wake-word detection algorithm to detect the wake word. As noted above, in some embodiments the sound data that is not identified as containing voice activity is not spatially processed. In contrast, the sound data that is identified as including voice activity is spatially processed and can be stored as filtered sound data. The filtered sound data can then be used for wake-word detection. In various embodiments, the voice activity detector 550 can be configured to store data to a fixed length circular buffer when it is running. The buffer length can correspond to the time duration of past data which will be passed to downstream components (e.g., the VCC 560). After detecting voice activity, the buffered data will first be passed to all the downstream components (including the spatial processor) followed by new incoming data from the microphone array. This provides the computational advantage that most non-speech microphone data will be overwritten in the ring buffer and never passed downstream for further processing.

Examples of wake words include (i) the wake word "Alexa" corresponding to AMAZON voice services, (ii) the wake word "Ok, Google" corresponding to GOOGLE voice services, or (iii) the wake word "Hey, Siri" corresponding to APPLE voice services. The algorithm(s) used in connection with wake-word engines can include various keyword spotting algorithms now known or later developed, or variations thereof. Examples of keyword detection algorithms include, but are not limited to, (i) the sliding window model, in which features within a sliding time-interval of the captured audio are compared to keyword models, (ii) a Hidden Markov Model (HMM), which can be constructed for each keyword as well as for non-keywords, such that the non-keyword models are used to help distinguish non-keyword speech from keyword speech, (iii) the use of Large Vocabulary Continuous Speech Recognition (LVCSR), in which input speech is decoded into lattices that are searched for predefined keywords, and (iv) the use of neural networks, such as deep neural networks (DNNs), convolutional neural networks (CNNs), or recurrent neural networks (RNNs) to model the keywords based on large amounts of keyword-specific training data.

The method 700 continues in block 718 with determining an action to be performed based on the sound data. For example, if the wake word detected in block 716 is associated with a VAS, the action may involve transmitting, via a network interface, the sound data to one or more remote computing devices associated with the VAS for further processing. For example, this can include the NMD transmitting, via a network interface to one or more servers of the respective voice service, data representing the sound data and a command or query to process the data representing the sound data. The command or query may cause the respective voice service to process the voice command and may vary according to the respective voice service so as to conform the command or query to the respective voice service (e.g., to an API of the voice service).

As noted above, in some examples, the captured audio includes voice input 680, which in turn includes a first portion representing the wake word 680a and a second portion representing a voice utterance 680b, which can include one or more commands such as command 682. In some cases, the NMD may transmit only the data representing at least the second portion of the voice input (e.g., the portion representing the voice utterance 680b). By excluding the first portion, the NMD may reduce bandwidth needed to transmit the voice input 680 and avoid possible misprocessing of the voice input 680 due to the wake word 680a, among other possible benefits. Alternatively, the NMD may transmit data representing both portions of the voice input 680, or some other portion of the voice input 680.

In some embodiments, causing the respective voice service to process the captured sound data involves the NMD querying a wake-word-detection algorithm corresponding to the respective voice service. As noted above, queries to the voice services may involve invoking respective APIs of the voice services, either locally on the NMD or remotely using a network interface. In response to a query to a wake-word-detection algorithm of the respective voice service, the NMD receives a response indicating whether or not the captured sound data submitted in the query included the wake word corresponding to that voice service. When a wake-word-detection algorithm of a specific voice service detects that the captured sound data includes the particular wake word corresponding to the specific voice service, the NMD may cause that specific voice service to further process the sound data, for instance, to identify voice commands in the captured sound data.

After causing the respective voice service to process the captured audio, the NMD receives results of the processing. For instance, if the detected sound data represents a search query, the NMD may receive search results. As another example, if the detected sound data represents a command to a device (e.g., a media playback command to a playback device), the NMD may receive the command and perhaps additional data associated with the command (e.g., a source of media associated with the command). The NMD may output these results as appropriate based on the type of command and the received results.

Alternatively, if the detected sound data includes a voice command directed to another device other than the NMD, the results might be directed to that device rather than to the NMD. For instance, referring to FIG. 1A, NMD 103f in the kitchen 101h may receive a voice input that was directed to playback device 102l of the dining room 101g (e.g., to adjust media playback by playback device 102l). In such an embodiment, although NMD 103f facilitates processing of the voice input, the results of the processing (e.g., a command to adjust media playback) may be sent to playback device 102l). Alternatively, the voice service may send the results to NMD 103f, which may relay the command to playback device 102l or otherwise cause playback device 102l to carry out the command.

After the action determined in block 718 has been performed, or prior to this time, the NMD can transition back to the first stage (e.g., a low-power or standby stage). In some embodiments, this transition can occur once speech is no longer detected in newly received sound data at the voice activity detector. Additionally or alternatively, this transition can occur after a predetermined period of time has elapsed, for example a given time period (e.g., 1 minutes) since the wake-word was detected. In some embodiments, this transition can occur once the voice interaction is completed, including multi-turn interactions, as indicated by the VAS state, or after a predetermined period of time has elapsed.

Figure 8B:
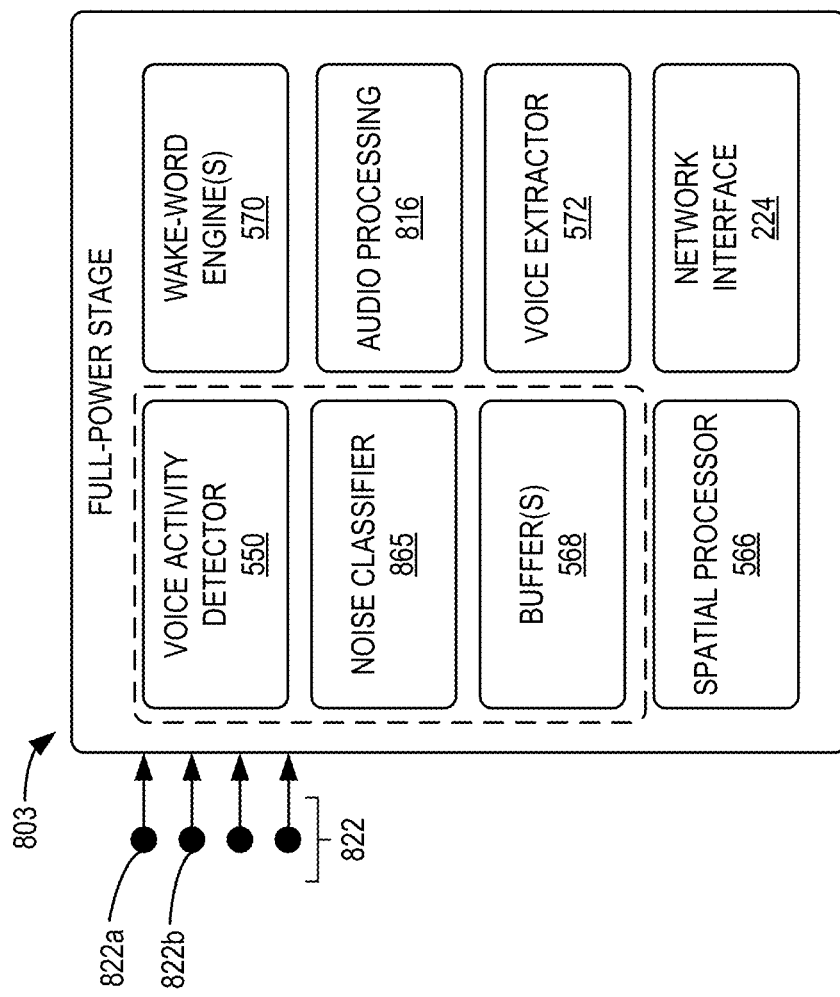
FIGS. 8A and 8B are schematic diagrams showing a network microphone device in various stages of operation in accordance with aspects of the disclosure.
Figure 8A:
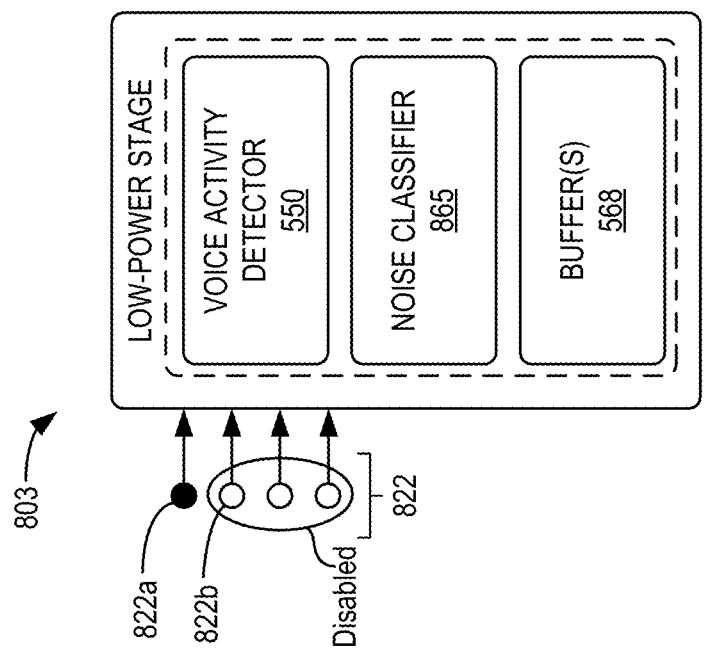

As noted above, keyword detection can be energy-intensive, and in the case of portable devices, draw additional power from the device's battery, which reduces the amount of time that a portable device can operate before it needs to be recharged. In addition to components used for keyword detection, other components that may draw additional power include microphones, voice capture components, network communication components (e.g., wireless transceivers configured to communicate over a network interface), and audio processing components, among other components. FIGS. 8A and 8B are schematic diagrams illustrating an NMD 803 in certain configurations, or stages, in which such components are enabled/disabled to conserve power during operation. A component that is enabled from a disabled state may be turned on, supplied power or additional power, taken out of standby or sleep stage, or otherwise activated in such a way that the enabled component is allowed to draw more power than it could when disabled. Although described in the context of a portable NMD, it will be appreciated that a stationary playback device may be configured in a similar manner to reduce processing load and power consumption.

Referring first to FIG. 8A, the NMD 803 is in a first stage, or low-power stage, in which a limited number of components have been enabled. For instance, in FIG. 8A, a single microphone 822a is enabled while other microphones 822 are disabled. In some embodiments, one or more additional microphone(s) 822b, but fewer than all of the microphones may be enabled. Also during the first stage, other components of the NMD 803 (not shown in FIG. 8A) may be disabled, such as DSP and application processors, among other components. In various embodiments, the low power mode shown in 8A does necessarily require any microphones to be powered down, for instance when the primary goal is to reduce power usage by the processer, rather than the microphone bias. While powering down the microphones may slightly reduce overall power usage, one problem is that it might take more than 100 ms for the microphones to begin producing a good signal after the bias voltage is applied. Disabled microphones will not produce a buffered signal which can be used for spatial processing when the NMD wakes up.

In addition to enabling certain microphone(s) during the first stage, the NMD 803 enables a voice-activity detector 550, a noise classifier 865, and one or more buffers 568. In operation, the voice-activity detector 550 can determine if a sound is detected by the enabled microphone(s) 822 (using, e.g., a voice-activity detection algorithm, such as a voice activity detection algorithm that is less computationally intensive than a wake-word engine), and the noise classifier 865 may classify the detected sound as being a detected sound of interest. Captured sound data can be stored in a rolling basis in one or more buffers 568. In one example, the noise classifier may detect if there is a spike in a signal-to-noise ratio in ambient sound detected by an enabled microphone. In any event, if there is a detected sound of interest, this causes the NMD 803 to proceed to a second stage, or low-power stage, to enable/disable additional components.

Additionally or alternatively, the NMD 803 can determine whether to proceed from the first stage to the second stage based on whether a user is in proximity to the NMD 803, as the detected presence of a user may correlate with an increased likelihood of the NMD 803 receiving voice input and the absence of a user may likewise correlate with a decreased likelihood of the NMD 803 receiving voice input. To facilitate determining whether a user is in proximity to the NMD 803, the NMD 803 may include a proximity sensor or presence detector. For instance, the NMD 803 may include an optical or radio frequency proximity sensor that emits a signal into an environment of the NMD 803 and determines the presence of a user based on changes in the reflected signal. In some examples, the NMD 803 detects the presence of a user based on detecting network interference via a wireless network interface of the NMD 803, such as by detecting interference with a Wi-Fi signal of the NMD 803. In any case, responsive to detecting the presence of a user, the NMD 803 can proceed from the first stage to a second stage.

Referring to FIG. 8B, in a second stage or full-power stage, the NMD 803 enables a number of additional components for processing of captured sound data. These components can include the spatial processor 566, audio processing components 816, and all the microphones 822 to process detected sound. The NMD 803 also enables a wake-word engine 570 (and/or other appropriate voice-input identification engine(s)). During the second stage, the NMD 803 also enables a voice extractor 572 and network communication components associated with the network interface 224 for transmitting potential voice input to a remote VAS (not shown). In some embodiments, the NMD may enable audio processing components during the third stage, such as readying one or more amplifiers, for outputting audio or other content. In other embodiments, the NMD 803 may wait until a subsequent full-performance stage to enable certain audio processing components, such as after confirming that a wake word was positively identified. Further, during the second stage or a subsequent full-performance stage, the NMD 803 may fully enable DSP and application processors.

If a wake word is not spotted during the second stage, the NMD 803 may return to the first stage shown in FIG. 8A to conserve power. The NMD 803 may also return to the first stage if the device has been idle for a certain amount of time and/or in response to an instruction to enter a lower-power mode.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A network microphone device (NMD) comprising:
  a plurality of microphones;
  a network interface;
  one or more processors; and
  a tangible, non-transitory, computer-readable medium storing instructions that, when executed by the one or more processors, cause the NMD to perform operations comprising:
    detecting first sound data via at least one of the microphones;
    determining, via a voice activity detection process, that the first sound data does not include voice activity;
    storing the first sound data in a buffer;
    after determining that the first sound data does not include voice activity, forgoing spatial processing of the first sound data;
    capturing second sound data via the at least one microphone;
    determining, via the voice activity detection process, that the second sound data includes voice activity;
    after determining that the second sound data includes voice activity, spatially processing the second sound data using a spatial processor to produce filtered sound data;
    storing the filtered sound data in the buffer;
    detecting, via a wake-word engine, a wake word based on data in the buffer; and
    after detecting the wake word, determining an action to be performed based on the data in the buffer.

2. The NMD of claim 1, wherein the second sound data comprises less than about 300 milliseconds of sound data.

3. The NMD of claim 1, wherein determining the action to be performed based on the data in the buffer comprises:
  transmitting, via the network interface, at least a portion of the second sound data to one or more remote computing devices associated with a voice assistant service corresponding to the detected wake word for processing a voice utterance.

4. The NMD of claim 1, wherein the operations further comprise performing the determined action, wherein the action comprises controlling playback of audio content.

5. The NMD of claim 1, wherein the operations comprise, after determining that the second sound data includes voice activity, transitioning the NMD from a first stage to a second stage, and wherein, in the first stage, the one or more processors operate at a lower average clock speed than in the second stage.

6. The NMD of claim 1, wherein the operations further comprise, after determining that the second sound data includes voice activity, transitioning the NMD from a first stage to a second stage, and wherein, in the first stage, the NMD consumes less power than in the second stage.

7. The NMD of claim 1, wherein the operations further comprise, after determining that the second sound data includes voice activity, transitioning the NMD from a first stage to a second stage, and wherein, in the first stage, the spatial processor is in a low-power standby mode.

8. The NMD of claim 1, wherein the operations further comprise, after determining that the second sound data includes voice activity, transitioning the NMD from a first stage to a second stage, and, after determining the action to be performed, transitioning the NMD from the second stage to the first stage.

9. A method comprising:
  detecting first sound data via at least one microphone of a network microphone device (NMD);
  determining, via a voice activity detection process of the NMD, that the first sound data does not include voice activity;
  storing the first sound data in a buffer;
  after determining that the first sound data does not include voice activity, forgoing spatial processing of the first sound data;
  capturing second sound data via at the at least one microphone;
  determining, via the voice activity detection process, that the second sound data includes voice activity;
  after determining that the second sound data includes voice activity, spatially processing the second sound data using a spatial processor to produce filtered sound data;
  storing the filtered sound data in the buffer;
  detecting, via a wake-word engine, a wake word based on data in the buffer; and
  after detecting the wake word, determining an action to be performed based on data in the buffer.

10. The method of claim 9, wherein the second sound data comprises less than about 300 milliseconds of sound data.

11. The method of claim 9, wherein determining the action to be performed based on data in the buffer comprises:

transmitting, via a network interface of the NMD, at least a portion of the second sound data to one or more remote computing devices associated with a voice assistant service corresponding to the detected wake word for processing a voice utterance.

12. The method of claim 9, further comprising performing the determined action, wherein the action comprises controlling playback of audio content.

13. The method of claim 9, further comprising, after determining that the second sound data includes voice activity, transitioning the NMD from a first stage to a second stage, and wherein, in the first stage, the NMD consumes less power than in the second stage.

14. The method of claim 9, further comprising, after determining that the second sound data includes voice activity, transitioning the NMD from a first stage to a second stage, and after determining the action to be performed, transitioning the NMD from the second stage to the first stage.

15. A tangible, non-transitory computer-readable medium storing instructions that, when executed by one or more processors of a network microphone device (NMD), cause the NMD to perform operations comprising:
  detecting first sound data via at least one microphone of the NMD;
  determining, via a voice activity detection process of the NMD, that the first sound data does not include voice activity;
  storing the first sound data in a buffer;
  after determining that the first sound data does not include voice activity, forgoing spatial processing of the first sound data;
  capturing second sound data via at the at least one microphone;
  determining, via the voice activity detection process, that the second sound data includes voice activity;
  after determining that the second sound data includes voice activity, spatially processing the second sound data using a spatial processor to produce filtered sound data;
  storing the filtered sound data in the buffer;
  detecting, via a wake-word engine, a wake word based on data in the buffer; and
  after detecting the wake word, determining an action to be performed based on data in the buffer.

16. The computer-readable medium of claim 15, wherein the second sound data comprises less than about 300 milliseconds of sound data.

17. The computer-readable medium of claim 15, wherein determining the action to be performed based on data in the buffer comprises:
  transmitting, via a network interface of the NMD, at least a portion of the second sound data to one or more remote computing devices associated with a voice assistant service corresponding to the detected wake word for processing a voice utterance.

18. The computer-readable medium of claim 15, wherein the operations further comprise performing the determined action, wherein the action comprises controlling playback of audio content.

19. The computer-readable medium of claim 15, wherein the operations further comprise, after determining that the second sound data includes voice activity, transitioning the NMD from a first stage to a second stage, and wherein, in the first stage, the NMD consumes less power than in the second stage.

20. The computer-readable medium of claim 15, wherein the operations further comprise:
  after determining that the second sound data includes voice activity, transitioning the NMD from a first stage to a second stage; and
  after determining the action to be performed, transitioning the NMD from the second stage to the first stage.

* * * * *

UNITED STATES PATENT AND TRADEMARK OFFICE
CERTIFICATE OF CORRECTION

| | |
|---|---|
| PATENT NO. | : 11,769,511 B2 |
| APPLICATION NO. | : 18/060176 |
| DATED | : September 26, 2023 |
| INVENTOR(S) | : Jones et al. |

It is certified that error appears in the above-identified patent and that said Letters Patent is hereby corrected as shown below:

On the Title Page

Item (57), in Column 2, under "Abstract", Line 10, delete "the sound" and insert -- the second sound --, therefor.

Signed and Sealed this
Seventh Day of November, 2023

Katherine Kelly Vidal
*Director of the United States Patent and Trademark Office*